Kevin Murphy

United States Patent
Da Palma et al.

(10) Patent No.: US 9,827,641 B2
(45) Date of Patent: Nov. 28, 2017

(54) LOW PRESSURE SHUT OFF FOR A PNEUMATIC TOOL

(71) Applicant: Apex Brands, Inc., Apex, NC (US)

(72) Inventors: Edouard Da Palma, Boulogne-Billancourt (FR); Pascal Bourcier, Bussy Saint Georges (FR)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 14/770,046

(22) PCT Filed: Feb. 24, 2014

(86) PCT No.: PCT/US2014/018104
§ 371 (c)(1),
(2) Date: Aug. 24, 2015

(87) PCT Pub. No.: WO2014/133978
PCT Pub. Date: Sep. 4, 2014

(65) Prior Publication Data
US 2016/0003370 A1    Jan. 7, 2016

Related U.S. Application Data

(60) Provisional application No. 61/822,959, filed on May 14, 2013, provisional application No. 61/769,736, filed on Feb. 26, 2013.

(51) Int. Cl.
*B23Q 5/32* (2006.01)
*B23Q 5/26* (2006.01)
(Continued)

(52) U.S. Cl.
CPC .............. *B23Q 5/326* (2013.01); *B23Q 5/261* (2013.01); *B23Q 5/263* (2013.01); *B23Q 5/265* (2013.01);
(Continued)

(58) Field of Classification Search
CPC ........ F16K 1/34; F16K 27/02; F16K 31/1225; B25B 21/00; B25F 3/00; B25F 5/00;
(Continued)

(56) References Cited

U.S. PATENT DOCUMENTS 843,391 A * 2/1907 Ferris .................... F16K 31/122
251/63
1,312,644 A    8/1919 Raab et al.
(Continued)

FOREIGN PATENT DOCUMENTS

CN    2123665 U    12/1992
CN    2632425 Y    8/2004
(Continued)

*Primary Examiner* — Kevin Murphy
*Assistant Examiner* — Kelsey Rohman
(74) *Attorney, Agent, or Firm* — Coats & Bennett, PLLC

(57) ABSTRACT

A low pressure shut off for a pneumatic tool. The tool may include an air path for input air. A shaft may be positioned along the air path and movable relative to the air path between a first position and a second position. First and second pistons may be spaced axially apart along the shaft and each may extend radially outward beyond the shaft. In the first position, the first piston may extend across the air path to block the air path. In the second position, the second piston may be positioned to be acted on by air from a secondary inlet to apply a force to the second piston that overcomes a biasing force and positions the first piston to allow air to flow along the air path.

17 Claims, 6 Drawing Sheets

(51) Int. Cl.

| | |
|---|---|
| *B23Q 11/04* | (2006.01) |
| *F16K 1/34* | (2006.01) |
| *F16K 27/02* | (2006.01) |
| *F16K 31/122* | (2006.01) |
| *B25F 5/00* | (2006.01) |
| *B25F 3/00* | (2006.01) |
| *B25F 5/02* | (2006.01) |
| *B25B 21/00* | (2006.01) |

(52) U.S. Cl.
CPC .............. *B23Q 11/04* (2013.01); *B25B 21/00* (2013.01); *B25F 3/00* (2013.01); *B25F 5/00* (2013.01); *B25F 5/001* (2013.01); *B25F 5/02* (2013.01); *F16K 1/34* (2013.01); *F16K 27/02* (2013.01); *F16K 31/1225* (2013.01)

(58) Field of Classification Search
CPC . B25F 5/001; B25F 5/02; B23Q 5/326; B23Q 5/261; B23Q 5/263; B23Q 5/265; B23Q 11/04
USPC ........ 251/14, 33, 63, 63.5, 63.6, 62, 28, 323
See application file for complete search history.

(56) References Cited

U.S. PATENT DOCUMENTS

| | | | | |
|---|---|---|---|---|
| 2,728,547 | A | * | 12/1955 | Crookston ............ E21B 21/106 137/492.5 |
| 2,893,272 | A | | 7/1959 | Linsker |
| 3,411,385 | A | | 11/1968 | Quackenbush |
| 3,577,807 | A | | 5/1971 | Alexander et al. |
| 5,860,446 | A | | 1/1999 | Hunt |
| 6,082,468 | A | * | 7/2000 | Pusateri ................. B25B 21/00 173/162.2 |
| 6,261,033 | B1 | * | 7/2001 | Thames ................. B23Q 5/326 408/1 R |
| 7,806,637 | B2 | | 10/2010 | Oehninger et al. |
| 8,469,641 | B2 | | 6/2013 | Jaillon |
| 2008/0054204 | A1 | * | 3/2008 | Zhou ....................... F01M 1/20 251/63 |
| 2008/0260485 | A1 | | 10/2008 | Jaillon et al. |

FOREIGN PATENT DOCUMENTS

| | | |
|---|---|---|
| CN | 101093034 A | 12/2007 |
| CN | 101625043 A | 1/2010 |
| EP | 0060186 A2 | 9/1982 |
| EP | 1618978 A1 | 1/2006 |
| EP | 1916045 A1 | 4/2008 |
| FR | 2881366 A1 | 8/2006 |
| GB | 2195164 A | 3/1988 |
| WO | 0078502 A2 | 12/2000 |
| WO | 0105559 A2 | 1/2001 |

* cited by examiner

LOW PRESSURE SHUT OFF FOR A PNEUMATIC TOOL

RELATED APPLICATIONS

The present application claims priority to U.S. Application No. 61/769,736 filed on Feb. 26, 2013 entitled Feed Drill and U.S. Application No. 61/822,959 filed on May 14, 2013 entitled Feed Drill.

BACKGROUND

The present application is directed to a pneumatic tool and, more specifically, to a pneumatic tool with a low pressure shut off to stop operation of the tool when input air pressure falls below a predetermined level.

Pneumatic tools are power tools driven by compressed air supplied by a compressor or storage tank such as an air cylinder. Pneumatic tools are popular because they are generally safer to use than electric powered tools. Pneumatic tools may also have a higher power-to-weight ratio making them smaller and lighter thereby facilitating their use. Types of pneumatic tools include but are not limited to air wrench, air ratchet, jackhammer, pneumatic drill, and pneumatic nail gun.

Pneumatic tools are designed to operate provided there is an adequate input air pressure. The operation of the tool can be significantly affected if the input air pressure is allowed to drop too low. Low air pressure may results in reduced tool speed, reduced tool power, and possible stalling issues.

Existing designs have provided for a low pressure shut off. These designs have included a tip valve actuated by a piston with a spring force that can stop the air flow in the event the pressure becomes too low. However, there have been issues with the amount of air that a tip valve can flow. Increasing the amount of air flow increases the power that the air tool can provide which can allow the tool to do more or to do the same thing faster.

SUMMARY

The present application is directed to low pressure shut off for a pneumatic tool. The shut off provides for the tool to operate when the air pressure of incoming air exceeds a predetermined amount. The shut off prevents operation of the tool when the air pressure falls below the predetermined amount.

One embodiment is a low pressure shut off for a pneumatic tool. The shut off includes an air path with a main inlet, an outlet, and a secondary inlet. A shaft is positioned along the air path between the main inlet and the outlet. The shaft is movable relative to the air path between a first position and a second position. First and second pistons are spaced axially apart along the shaft and each extends radially outward beyond the shaft. A biasing member acts on the shaft to bias the shaft towards the first position. In the first position, the first piston extends across the air path between the main inlet and the outlet to block the air path. In the first position, the second piston is positioned to be acted on by air from the secondary inlet to apply a force to the second piston that overcomes the force of the biasing member and positions the shaft at the second position with the first piston away from the air path to allow air to flow along the air path between the main inlet and the outlet.

The air path may include a neck positioned between the main inlet and the outlet, and the neck and the first piston may include a common sectional shape and size such that the first piston blocks the air path at the neck in the first position.

A flexible gasket may be mounted at a periphery of the first piston such that the gasket contacts against the neck in the first position.

The low pressure shut off may include a second bore with sidewalls and a bottom with the second piston positioned in the second bore in the first position and having a common sectional shape and size as the second bore.

The second bore may be positioned away from an air path that extends between the main inlet and the outlet.

The low pressure shut off may include a first bore positioned away from an air path that extends between the main inlet and the outlet. The first bore may include a sectional shape and size that matches the first piston. The first piston may be positioned in the first bore in the second position and away from the first bore in the first position.

The biasing member may be positioned away from an air path that extends between the main inlet and the outlet.

The low pressure shut off may include a shut-off button at an end of the shaft. The shut-off button may extend outward from a housing that extends around the low pressure shut off a greater amount in the second position than in the first position.

Another embodiment is directed to a method of operating a valve for a pneumatic tool. The method includes positioning a first piston in a first position at a neck in an air path and blocking air from flowing along the air path from an air inlet to an air outlet. The method includes applying a first force to a second piston and moving the first piston to a second position out of the neck and allowing the air to flow along the air path from the air inlet to the air outlet. The method includes applying a second force to the first piston through the air flowing along the air path and maintaining the first piston in the second position after the first force is removed from the second piston. The method also includes when air pressure of the air flowing along the air path falls below a preset level, moving the first piston to the first position and blocking air from flowing along the air path from the air inlet to the air outlet.

The method may also include biasing the first piston towards the first position.

The biasing force that biases the first piston towards the first position may be less than the second force that maintains the first piston in the second position when the air pressure is above the preset level.

The method may include moving each of the first and second pistons an equal amount between the second and first positions as the first and second pistons are each connected to a shaft.

The method may include sealing the first piston in a bore in the second position and preventing air from the air path from acting on an opposing side of the first piston that faces away from the air path.

The method may include moving air through a secondary inlet and applying air against the second piston to create the first force. The secondary inlet may be positioned away from the air path that extends from the air inlet to the air outlet.

The method may include moving a manual shut-off button outward relative to an outer housing when moving the first piston from the first position to the second position.

The various aspects of the various embodiments may be used alone or in any combination, as is desired.

DETAILED DESCRIPTION

The present application is directed to a low pressure shut off for a pneumatic tool. The tool may include an air path for input air. A shaft is positioned along the air path and movable relative to the air path between a first position and a second position. First and second pistons are spaced axially apart along the shaft and each extends radially outward beyond the shaft. In the first position, the first piston extends across the air path to block the air path. In the first position, the second piston is positioned to be acted on by air from a secondary inlet to apply a force to the second piston that overcomes a biasing force and moves it to the second position that positions the first piston to allow air to flow along the air path.

Figure 1:
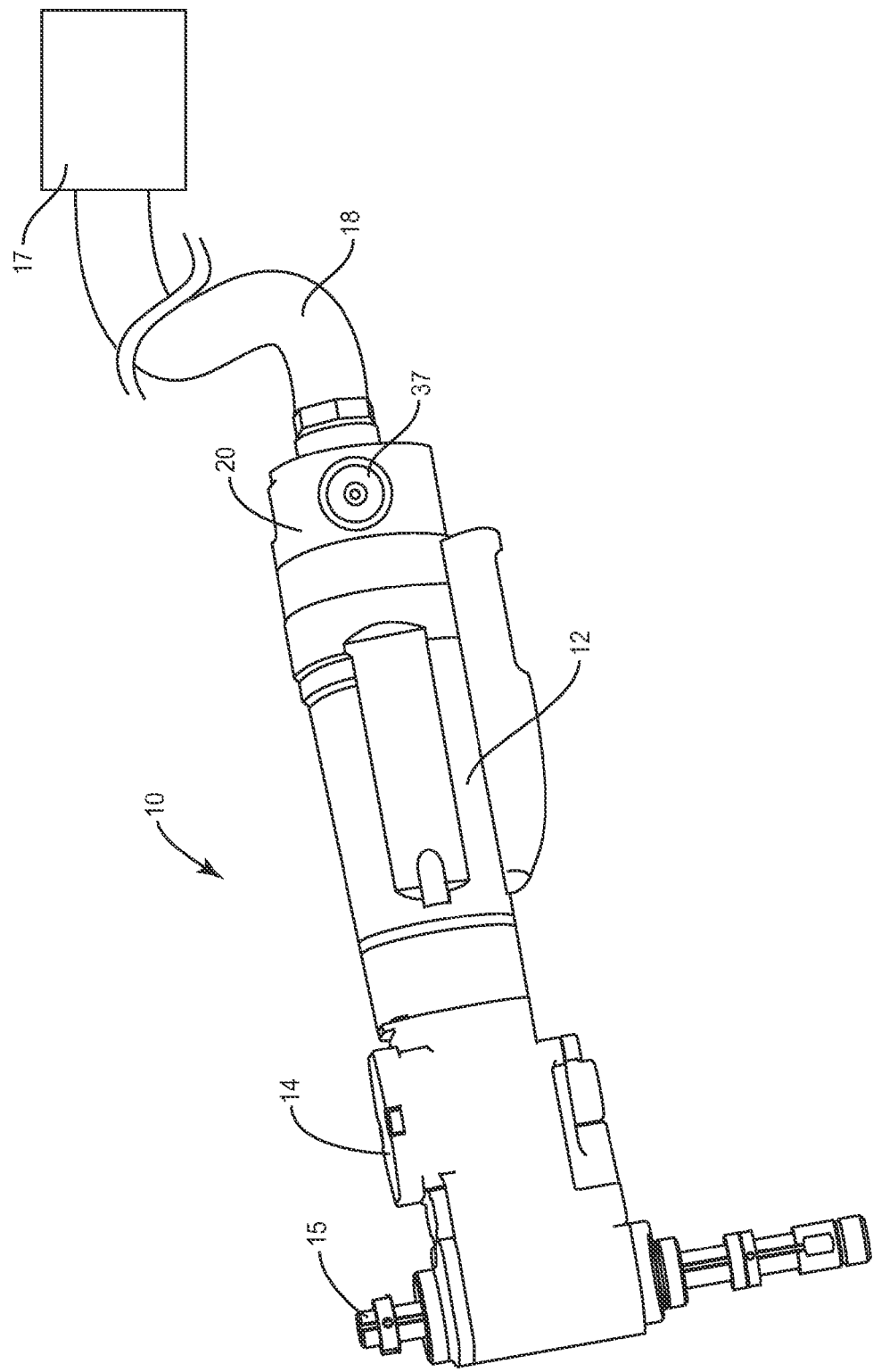
FIG. 1 is a perspective view of a first type of a feed tool.
Figure 2:
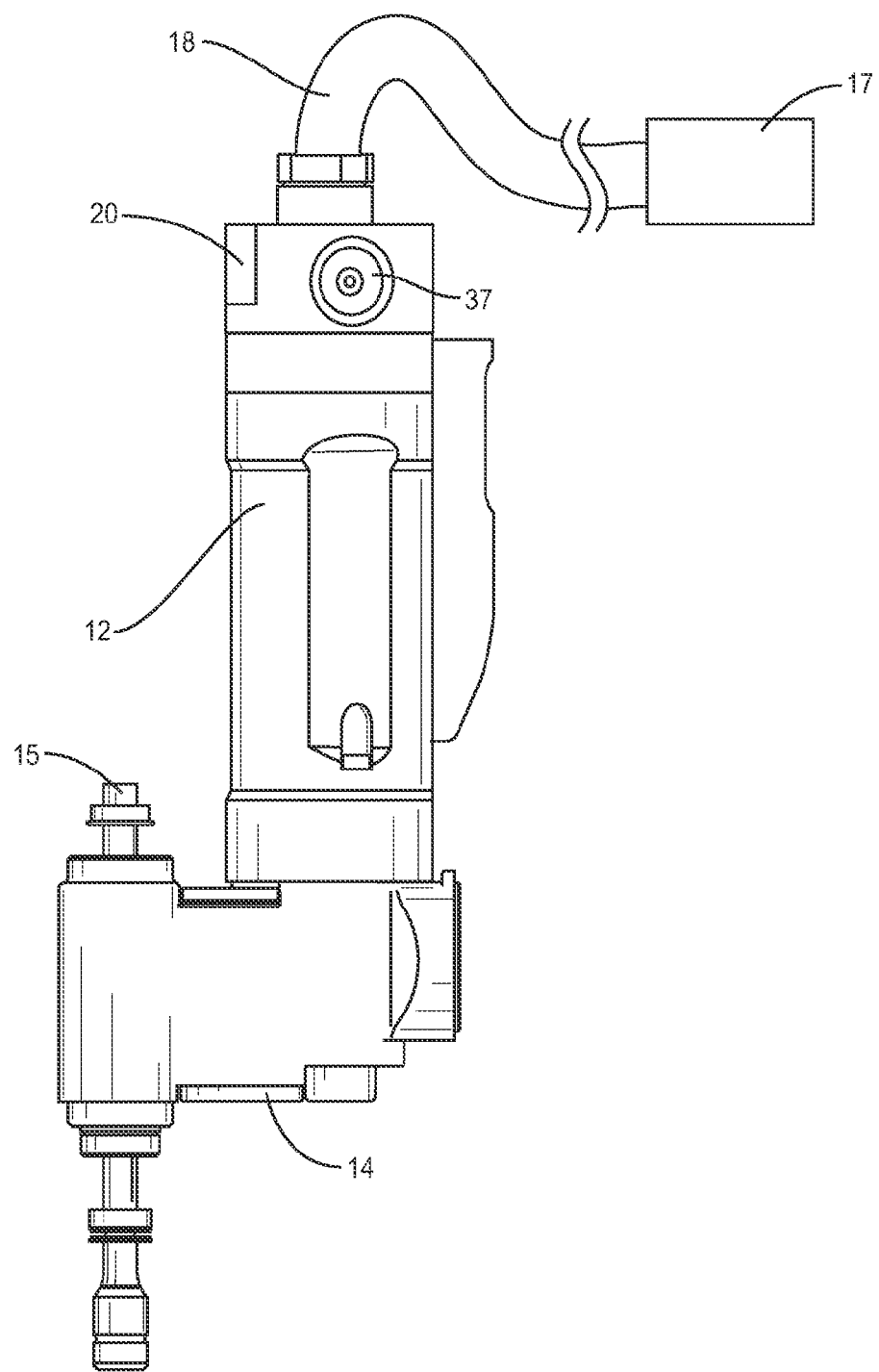
FIG. 2 is a perspective view of a second type of a feed tool.

FIGS. 1 and 2 illustrate pneumatic tools 10 that each includes an air motor 12, and a gear head 14 with a spindle 15. A connector 20 is positioned between the air motor 12 and an air supply 17. The air travels from the supply 17 to the connector 20 through a hose 18. Air may be supplied from a variety of different supplies 17 including but not limited to an air compressor and a pressurized tank. Although most tools 10 are powered using air, other types of gases may also be used, such as but not limited to oxygen-free nitrogen and carbon dioxide.

The gear head 14 includes gears that are arranged to provide rotation and/or axial movement to the spindle 15. The spindle 15 may be equipped to receive a tool bit at a forward end to operate on a workpiece. FIGS. 1 and 2 include feed drills used for drilling holes in workpieces formed of substances such as steel, aluminum, titanium, and composites. Various tools 10 may include various shapes and sizes, and different tools 10 may perform a variety of different functions. FIG. 1 illustrates a right-angle tool in which the air motor 12 is aligned perpendicular to an axis of the spindle 15. FIG. 2 illustrates an inline configuration with the air motor 12 generally parallel with the axis of the spindle 15. FIGS. 1 and 2 include feed drills, although various other air-powered tools 10 are applicable to the low pressure shut off disclosed in this application. The various tools 10 may include various shapes and sizes, and different tools 10 may perform a variety of different functions.

The air motor 12 may include an air logic system that controls one or more functions of the tool 10. The air logic system operates using the input air from the air supply 17. The various functions performed by the air logic system include but are not limited to opening and closing a variety of valves and/or moving pistons from first to second positions.

The efficient operation of the tool 10 is reliant on a certain minimum air supply pressure. This pressure is needed to operate the functional aspects of the tool and also to provide for air for operation of the air logic system. In the embodiment of a positive feed drill, the air supply pressure is required to power the gear head 14 to drive the spindle 15 to drill a hole in the workpiece. Given that, as the air pressure lowers, the performance of the tool 10 will deteriorate. It is desirable to provide a manner of preventing operation of the tool 10 if the air pressure drops too low.

To address the low pressure issue, the tool 10 is equipped with a valve 30 that provides air to operate the air motor 12 and control logic system when the minimum air pressure is available. In the event that the air pressure is too low, the valve 30 stops the operation of the tool 10.

Figure 3B:
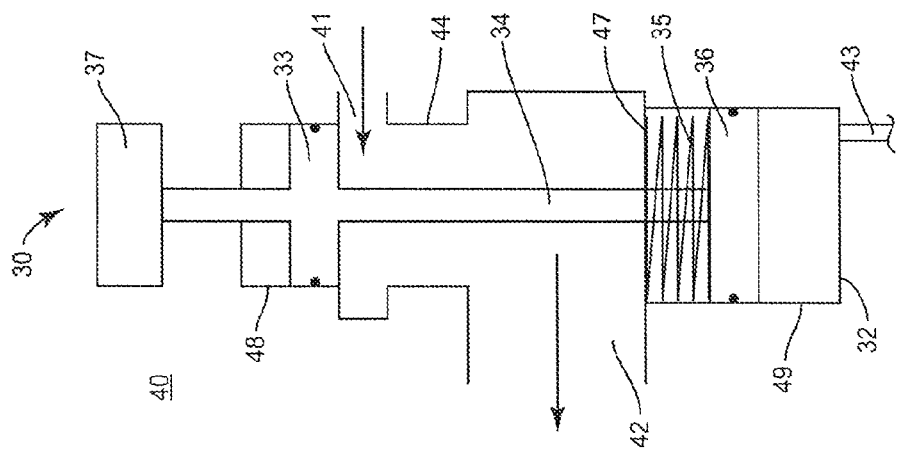
FIG. 3B is a side schematic view of a low pressure valve in a second open orientation.
Figure 3A:
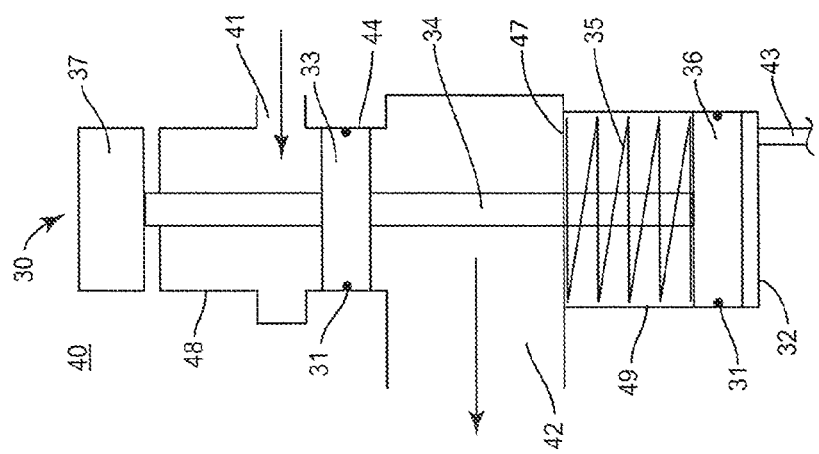
FIG. 3A is a side schematic view of a low pressure valve in a first closed orientation.

FIGS. 3A and 3B schematically illustrate a valve 30 located in a body 40 along an air supply line between the air supply 17 and the operational components of the air motor 12 and the air logic system. The valve 30 may be located at various locations along the air supply line, including but not limited to the connector 20, and an upstream portion of the air motor 12. In one specific embodiment, the valve 30 is located in the body 40 of the connector 20. The air supply line includes an air inlet 41 that receives air supplied by the air supply 17, and an air outlet 42 that leads to the air motor 12 and air logic system. A secondary air inlet 43 is also positioned at a lower section of the valve 30. The secondary air inlet 43 forms part of the air logic system and is to move the piston 36 from a first valve closed position to a second valve open position.

The valve 30 includes a movable shaft 34 that moves between a first closed orientation as illustrated in FIG. 3A and a second open orientation as illustrated in FIG. 3B. A first piston 33 extends radially outwardly from a first axial position along the shaft 34. A second piston 36 extends radially outwardly from a second axial position along the shaft 34. A manual shut-off button 37 is also mounted to the shaft 34. In one or more embodiments, the button 37 is positioned at an end of the shaft 34. A biasing member 35 applies a force to maintain the shaft 34 in the first closed orientation. In one specific embodiment, the biasing member 35 extends around the shaft 34 between the second piston 36 and a stop 47.

In the first closed orientation as illustrated in FIG. 3A, the shaft 34 is positioned with the first piston 33 positioned in a narrow neck 44 formed in the body 40. The neck 44 is positioned between the air inlet 41 and outlet 42. The piston 33 is sized to extend across the neck 44 to prevent air from flowing from the inlet 41 to the outlet 42. A gasket or seal 31 may be positioned on the peripheral edge of the piston 33 to provide contact with the walls of the neck 44 to further prevent air flow. The air may be totally prevented from moving from the inlet 41 to the outlet 42 when the shaft 34 is in the closed orientation. In one or more embodiments, a limited amount of air moves past through the neck 44 when in the first closed orientation. This small amount of air is not enough to operate the tool 10 or air logic system. The biasing member 35 biases the shaft 34 to this first closed orientation. In one or more embodiments, a bottom edge of the shaft 34 or piston 36 contacts against a bottom wall 32 of a bore 49 to control an extent of movement of the shaft 34 in the first closed orientation.

Movement from the first closed orientation to the second open orientation occurs by opening the second inlet 43. This may occur due to the operator pressing a switch, or some aspect of the air logic system opening a valve along a secondary supply line that feeds to the second inlet 43. A bottom surface of the piston 36 includes a surface area A2 and is sized to extend across and fill the bore 49. A gasket or seal 31 may also extend around the periphery to contact against the sidewalls of the bore 49. Air entering the bore 49 through the secondary inlet 43 acts on the bottom of the piston 36 and applies a force that is greater than the force of the biasing member 35. Therefore, the shaft 34 slides within the bore 49 towards the second open orientation. The first piston 33 that is connected to the shaft 34 moves out of the neck 44 and no longer blocks the air from flowing from the inlet 41 to the outlet 42. This provides for the air to flow to the air motor 12 and air logic system.

In one or more embodiments, the air from the secondary inlet 43 is supplied to the bore 49 for just a brief period of time (i.e., a pulse). This air applies a force that starts the shaft 34 moving towards the second open orientation. This pulse is adequate to move the shaft 34 fully to the second open orientation.

The shaft 34 moves a distance in the second open orientation to position the piston 33 in a bore 48. Once in the second open orientation, the shaft 34 remains at this position due to the force of the air that moves along the air path acting on the bottom of the piston 33 which maintains the piston 33 in the bore 48. The bottom of the piston 33 includes an area A1 against which the air applies a force. The force applied to the piston 33 is greater than that being applied by the biasing member 35. The area A1 and biasing member 35 are sized such the air pressure force overcomes the biasing member compression force based on the required minimum air pressure for tool operation. If the pressure drops below that pre-determined value, the biasing member 35 overcomes the low air pressure causing the shaft 34 to move to the first closed orientation thereby shutting off the air supplied to the tool 10 and preventing operation at low pressure.

While the shaft 34 is in the second open orientation and the tool 10 is running, the operator is able to press the manual shut-off button 37 to close the valve 30. The force required to press the shut-off button 37 is low as the force of the air acting on A1 is slightly above the force of the biasing member 35. Further, the amount of movement of the shaft 34 through pressing the shut-off button 37 is short as the movement just needs to unseat the piston 33 from the bore 48. Once the seal between the peripheral edge of the piston 33 and the side wall of the bore 48 is broken, the biasing member 35 will act to move the shaft 34 to the first closed orientation to shut the tool 10 off.

Figure 4A:
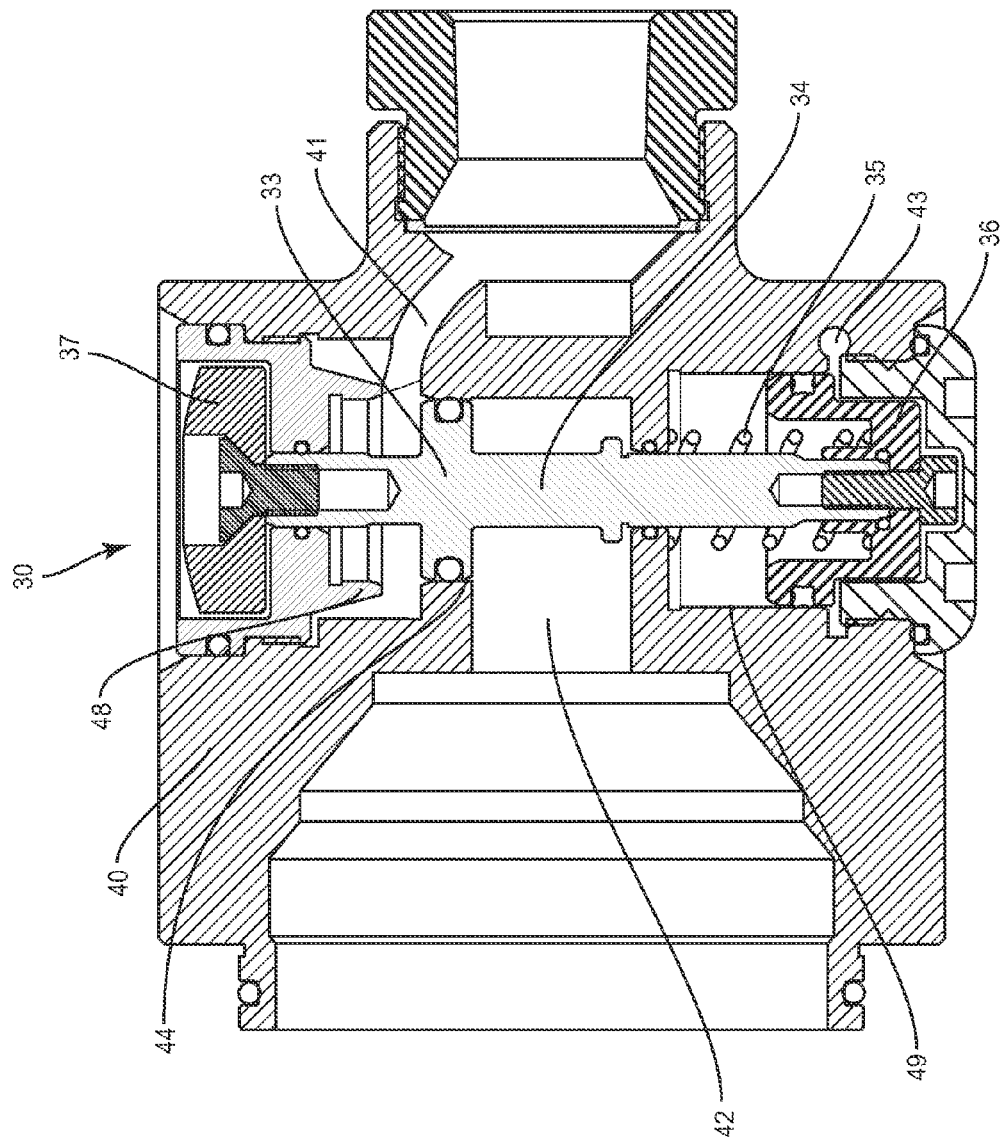
FIG. 4A is a side sectional view of a low pressure valve in a first closed orientation.
Figure 4B:
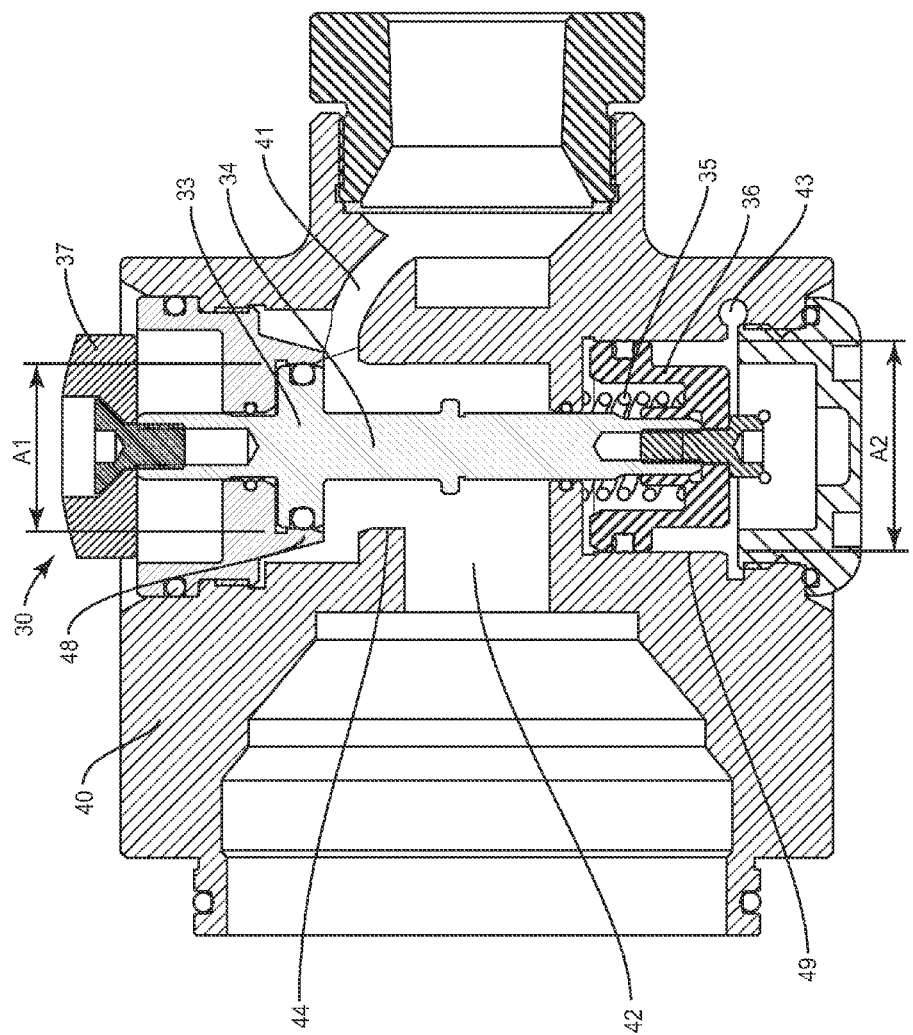
FIG. 4B is a side sectional view of a low pressure valve in a second open orientation.

FIGS. 4A and 4B illustrate embodiments of the valve 30 in the closed and second open orientations. As illustrated in FIG. 4A, in the first closed orientation the piston 33 prevents the air from the inlet 41 from getting to the air motor 12. The movement to the second open orientation starts upon receipt of a start signal with the piston 36 acting as the actuator for the start signal. When the operator pushes a start button (not illustrated) or otherwise causes the valve 30 to move, air is supplied to the bottom of the piston 36 through the secondary inlet 43.

In the second open orientation as illustrated in FIG. 4B, the shaft 34 is positioned to supply air to the air motor 12. The movement from the closed to second open orientations is at least partially caused by the air from the secondary inlet 43 acting on area A2 of the bottom of the piston 36. This force is sized to overcome the force of the biasing member 35 and provide for movement of the shaft 34. In the second open orientation, the shut-off button 37 also extends beyond the valve body 40 giving easy and obvious access for emergency shut off to an operator (see also FIGS. 1 and 2).

The signal to shift the start piston 36 is part of the standard tool air logic. In one or more embodiments, once the air motor 12 starts the air supplied through the secondary inlet 43 is stopped. The air from the inlet 41 acting on the underside of piston 33 (based on area A1) acts against biasing member 35 and maintains the valve 30 in the second open orientation. The area A1 and biasing member 35 are sized such the air pressure force overcomes the biasing member compression force based on the required minimum air pressure for tool operation. Based on Force=Pressure× Area, if the pressure drops below that pre-determined value, the biasing member 35 can overcome the low air pressure and will cause the valve to close and the system to return to the initial state shown in FIG. 4A thereby shutting off the tool 12 and preventing operation at low pressure.

Figure 5:
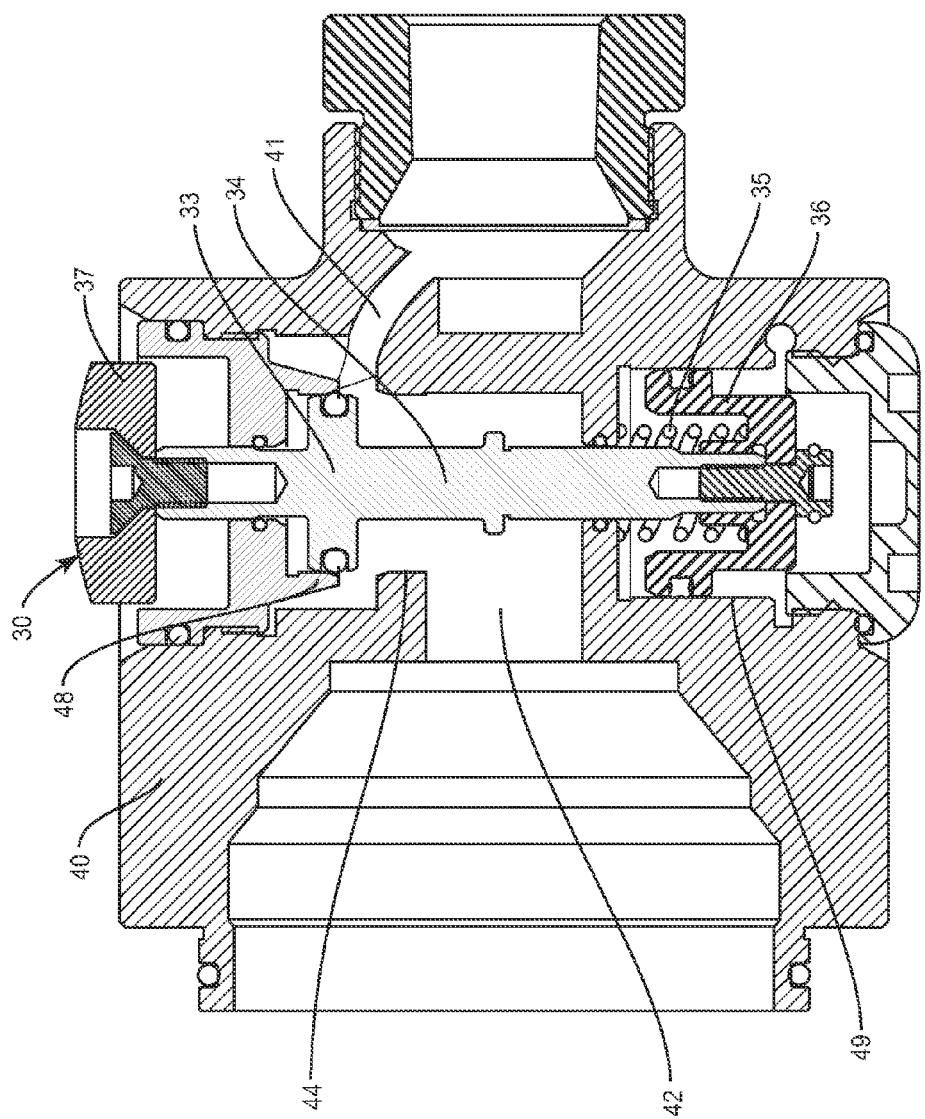
FIG. 5 is a side sectional view of a piston moving out of a housing bore in a low pressure valve.

While the tool is running, even if the air pressure is sufficient to maintain the valve 30 in the open position, the shut-off button 37 can be pressed to close the valve 30. A further enhancement of this design is that the force required on the shut-off button 37 can be kept low and the stop will have a minimum travel just to unseat the piston 33 in the housing bore 48. As illustrated in FIG. 5, once the seal is broken, the biasing member 35 will act to shut the tool off and return the valve 30 to the first closed orientation.

The biasing member 35 may include a variety of different configurations. The biasing member 35 may include a single member, or multiple members. The multiple members may be the same or may be different. The members may include, but are not limited to Belleville washers, wave washers, wave springs and compression springs.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A low pressure shut off for a pneumatic tool comprising:
  an air path comprising a main inlet, an outlet, and a secondary inlet;
  a shaft positioned along the air path between the main inlet and the outlet, the shaft being movable relative to the air path between a first position and a second position;
  first and second pistons spaced axially apart along the shaft and each extending radially outward beyond the shaft; and
  a biasing member acting on the shaft to bias the shaft towards the first position;

a first bore positioned away from the air path and including a sectional shape and size that matches the first piston;

a seal on the first piston that contacts and seals against walls of the first bore when the first piston is in the second position;

in the first position, the first piston extends across the air path between the main inlet and the outlet to block the air path;

in the first position, the second piston is positioned to be acted on by air from the secondary inlet to apply a force to the second piston that overcomes the force of the biasing member and position the shaft at the second position with the first piston away from the air path to allow air to flow along the air path between the main inlet and the outlet;

the first piston being positioned in the first bore in the second position such that a force acting on the first piston that is supplied through the air flowing along the air path maintains the first piston in the second position in the first bore after the force acting on the second piston that is supplied from the air from the secondary inlet is removed from the second piston.

2. The low pressure shut off according to claim 1, wherein the air path includes a neck positioned between the main inlet and the outlet, the neck and the first piston including a common sectional shape and size such that the first piston blocks the air path at the neck in the first position.

3. The low pressure shut off according to claim 2, wherein the seal comprises a flexible gasket mounted at a periphery of the first piston such that the gasket contacts against the neck in the first position.

4. The low pressure shut off according to claim 1, further comprising a second bore with sidewalls and a bottom, the second piston positioned in the second bore in the first position and having a common sectional shape and size as the second bore.

5. The low pressure shut off according to claim 4, wherein the second bore is positioned away from the air path that extends between the main inlet and the outlet.

6. The low pressure shut off according to claim 1, wherein the biasing member is positioned against the second piston and away from the air path that extends between the main inlet and the outlet in both the first and second positions.

7. The low pressure shut off according to claim 1, further comprising an opening in the first bore through which the shaft extends and a shut-off button at an end of the shaft, the shaft extending through the opening to position the shut-off button outward from a housing that extends around the low pressure shut off a greater amount in the second position than in the first position.

8. A method of operating a valve for a pneumatic tool, the method comprising:
    positioning a first piston in a first position at a neck in an air path and blocking air from flowing along the air path from an air inlet to an air outlet;
    applying a first force to a second piston and moving the first piston to a second position out of the neck and allowing the air to flow along the air path from the air inlet to the air outlet;
    applying a second force to the first piston through the air flowing along the air path and maintaining the first piston in the second position after the first force is removed from the second piston;
    sealing the first piston at the second position and preventing the air from the air path from moving past the first piston; and
    when air pressure of the air flowing along the air path falls below a preset level, moving the first piston to the first position and blocking air from flowing along the air path from the air inlet to the air outlet.

9. The method of claim 8, further comprising biasing the first piston towards the first position.

10. The method of claim 9, wherein a biasing force that biases the first piston towards the first position is less than the second force that maintains the first piston in the second position when the air pressure is above the preset level.

11. The method according to claim 8, further comprising moving each of the first and second pistons an equal amount between the first and second positions as the first and second pistons are each connected to a shaft.

12. The method according to claim 8, further comprising sealing the first piston in a bore in the second position and preventing air from the air path from acting on an opposing side of the first piston that faces away from the air path.

13. The method according to claim 8, further comprising moving a pulse of air through a secondary inlet and applying air against the second piston to create the first force, the secondary inlet being positioned away from the air path that extends from the air inlet to the air outlet.

14. The method according to claim 8, further comprising moving a manual shut-off button outward relative to an outer housing when moving the first piston from the first position to the second position.

15. The method according to claim 8, further comprising drilling a hole in a workpiece when the first piston is in the second position and the air is moving along the air path.

16. The method according to claim 8, further comprising:
    stopping the first force from being applied to the second piston once the second force is applied to the first piston;
    maintaining the first piston in the second position after the first force is stopped from being applied to the second piston; and
    drilling a hole with the first piston in the second position.

17. The method according to claim 8, further comprising:
    applying the first force to the second piston by applying a pulse of air to the second piston;
    applying the second force to the first piston;
    stopping the first force from being applied to the second piston after applying the second force to the first piston; and
    drilling a hole in a workpiece while applying the second force to the first piston.

* * * * *